(12) United States Patent
Tokumoto et al.

(10) Patent No.: US 8,779,018 B2
(45) Date of Patent: Jul. 15, 2014

(54) CATALYST COMPOSITION FOR PRODUCTION OF RIGID POLYURETHANE FOAM AND ISOCYANURATE-MODIFIED RIGID POLYURETHANE FOAM AND RAW-MATERIAL COMPOSITION CONTAINING THE SAME

(75) Inventors: Katsumi Tokumoto, Shunan (JP); Yutaka Tamano, Shunan (JP)

(73) Assignee: Tosoh Corporation, Shunan-shi (JP)

( * ) Notice: Subject to any disclaimer, the term of this patent is extended or adjusted under 35 U.S.C. 154(b) by 0 days.

(21) Appl. No.: 13/274,937

(22) Filed: Oct. 17, 2011

(65) Prior Publication Data

US 2012/0035289 A1 Feb. 9, 2012

Related U.S. Application Data

(62) Division of application No. 10/573,705, filed as application No. PCT/JP2004/014555 on Sep. 28, 2004, now abandoned.

(30) Foreign Application Priority Data

Sep. 29, 2003 (JP) .................................. 2003-338661

(51) Int. Cl.
*C08G 18/18* (2006.01)
(52) U.S. Cl.
USPC ...... 521/128; 252/182.24; 502/150; 502/164; 502/200; 521/129; 521/130; 521/131; 521/170; 521/172
(58) Field of Classification Search
USPC .................. 521/128, 129, 130, 131, 170, 172; 252/182.24; 502/150, 164, 200
See application file for complete search history.

(56) References Cited

U.S. PATENT DOCUMENTS

| | | | |
|---|---|---|---|
| 3,699,078 A * | 10/1972 | Castro .............................. | 528/85 |
| 3,745,133 A * | 7/1973 | Giuseppe et al. ............. | 521/156 |
| 3,954,684 A | 5/1976 | Farrissey et al. | |
| 5,171,787 A | 12/1992 | Zama et al. | |
| 5,563,180 A | 10/1996 | Skowronski et al. | |
| 5,591,781 A | 1/1997 | Yoshimura et al. | |
| 5,958,990 A * | 9/1999 | Grimminger ................. | 521/125 |
| 5,997,954 A | 12/1999 | Decker et al. | |
| 6,025,026 A | 2/2000 | Smith et al. | |
| 7,572,837 B2 | 8/2009 | Kometani et al. | |
| 2003/0144371 A1 | 7/2003 | Kometani et al. | |
| 2007/0259773 A1 | 11/2007 | Burdeniuc et al. | |

FOREIGN PATENT DOCUMENTS

| | | |
|---|---|---|
| GB | 2 288 182 A | 10/1995 |
| JP | 58-93715 | 6/1983 |
| JP | 6-107761 | 4/1994 |
| JP | 8-120044 | 5/1996 |
| JP | 9-124760 | 5/1997 |
| JP | 3012897 | 12/1999 |
| JP | 2003-105051 | 4/2003 |
| JP | 2004-43713 | 2/2004 |
| KR | 10-2003-0036060 | 5/2003 |

OTHER PUBLICATIONS

Office Action issued Apr. 7, 2011 in Korea Patent Application No. 10-2006-7005988 (with English translation), filed Mar. 27, 2006.
Notice of Decision for Rejection issued Jan. 16, 2012 in Korean Patent Application No. 10-2006-7005988 (with English translation).
Supplementary European Search Report issued Mar. 30, 2012, in European Patent Application No. 04788439.0.
Office Action issued Mar. 1, 2013 in European Patent Application No. 04 788 439.0.
Notification of Reasons for Refusal issued Jan. 8, 213 in Japanese Patent Application No. 2009-193161 (with English translation), (2013).
Office Action issued Oct. 8, 2013 in European Patent Application No. 04 788 439.0.

* cited by examiner

*Primary Examiner* — John Cooney
(74) *Attorney, Agent, or Firm* — Oblon, Spivak, McClelland, Maier & Neustadt, L.L.P.

(57) ABSTRACT

In the present invention, a catalyst composition comprising the following amine compounds of (A) and (B) and/or (C) is used and further, a raw material-blended composition further containing a polyol component and water is used.

(A) A quaternary ammonium salt represented by the following general formula (1):

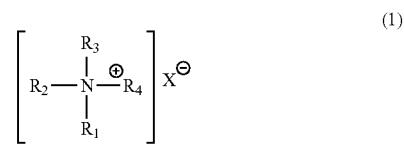

(1)

wherein each of $R_1$ to $R_3$ represents a hydrocarbon group having 1 to 12 carbon atoms, $R_4$ represents an alkyl group or an aromatic hydrocarbon group having 1 to 18 carbon atoms, and X represents an organic acid group having an acid dissociation constant (pKa) of 4.8 or less;

(B) A hydrophobic amine compound;
(C) A heterocyclic tertiary amine compound.

14 Claims, No Drawings

CATALYST COMPOSITION FOR PRODUCTION OF RIGID POLYURETHANE FOAM AND ISOCYANURATE-MODIFIED RIGID POLYURETHANE FOAM AND RAW-MATERIAL COMPOSITION CONTAINING THE SAME

This application is a divisional of Ser. No. 10/573,705, pending.

TECHNICAL FIELD

The present invention relates to a catalyst composition used in producing a rigid polyurethane foam and/or an isocyanurate-modified rigid polyurethane foam, a raw material-blended composition containing the catalyst composition, a polyol component and water, and a process for producing a rigid polyurethane foam and/or an isocyanurate-modified rigid polyurethane foam by reacting the raw material-blended composition with a polyisocyanate.

BACKGROUND ART

Since rigid polyurethane foams and isocyanurate-modified rigid polyurethane foams are excellent in heat insulation and self-adhesiveness, they are widely used as heat-insulating materials for electric refrigerator, building materials, and the like. The rigid polyurethane foams and isocyanurate-modified rigid polyurethane foams to be used for these applications are generally obtained by a method of mixing, with a polyisocyanate, a raw material-blended composition having mixed therewith a polyol component, a blowing agent, a catalyst, a foam stabilizer and the other additives, and causing a blowing reaction. In many cases, a raw material-blended composition for producing the rigid polyurethane foam and the isocyanurate-modified rigid polyurethane foam is stored for from several weeks to three months until the actual use after blending. Namely, since the raw material-blended composition is used after the passage of several weeks to three months from its blending, the storage stability becomes the issue.

Dichloromonofluoroethane (HCFC-141b) currently used as a blowing agent for the rigid polyurethane foams or isocyanurate-modified rigid polyurethane foams has a problem of ozone-layer destruction. Therefore, as a next-generation blowing agent instead thereof, hydrofluorocarbon (hereinafter sometimes referred to as HFC) without destroying an ozone layer is lined up as a substitute. As HFC, there are tetrafluoroethane (HFC134a), 1,1,1,3,3-pentafluoropropane (HFC245fa), 1, 1,1,3,3-pentafluorobutane (HFC365mfc), 1,1,1,2,3,3,3-heptafluoropropane (HFC227ea), and the like.

Moreover, a low-boiling hydrocarbon (hereinafter sometimes referred to as HC) without destroying an ozone layer is also regarded as a strong substitute. As examples of such a hydrocarbon (HC), hydrocarbons having a boiling point of −30 to 70° C. are used. As specific examples thereof, there are known propane, butane, pentane, cyclopentane, hexane, and mixtures thereof.

However, in the case of using a conventional catalyst, there is a problem that a raw material-blended composition containing such a blowing agent is poor in storage stability.

Moreover, in order to obtain a low-density foam, water is used as a blowing agent other than HC and HFC. In the case of using water, carbon dioxide formed in the reaction of water with a polyisocyanate component is utilized as a blowing component. Furthermore, it is also possible to use HC or HFC in combination with water.

However, in the case that water which generates a blowing component is contained in the raw material-blended composition, there is a problem of particularly poor storage stability of the raw material.

The reaction of forming a rigid polyurethane foam mainly comprises a urethane group-forming reaction by the reaction of a polyol with a polyisocyanate (resinification reaction) and a urea group-forming reaction by the reaction of a polyisocyanate with water (blowing reaction). Moreover, the reaction of forming an isocyanurate-modified rigid polyurethane foam comprises an isocyanurate ring-forming reaction by trimerization of a polyisocyanate (isocyanurate reaction) in addition to the above two kinds of reactions. The catalyst to be used in these reactions exerts large influence on not only the reaction rate but also the thermal conductivity of the foam, the curing rate of the foam surface, adhesive strength, moldability, dimensional stability, physical properties, and the like. Industrially, a viewpoint of storage stability is particularly important.

In this connection, for the reason of improving flame retardancy and physical properties, an aromatic polyester polyol obtained by esterification of an aromatic dicarboxylic acid is frequently used as a polyol component for rigid polyurethane foam and/or isocyanurate-modified rigid polyurethane foam products.

Conventionally, as a catalyst for producing rigid polyurethane foams, a compound of particularly promoting the resinification reaction and/or blowing reaction is used. As such a catalyst, an organometallic compound or a tertiary amine compound has been hitherto used. For example, as the tertiary amine compound as the catalyst for producing polyurethane foams to be used industrially, there are known compounds such as triethylenediamine, N,N,N',N'-tetramethyl-1,6-hexanediamine, N,N-dimethylcyclohexylamine, bis(2-dimethylaminoethyl)ether, and N,N,N',N'',N''-pentamethyldiethylenetriamine.

Moreover, as a catalyst for producing isocyanurate-modified rigid polyurethane foams, there are known organometallic catalysts such as alkali metal salts of carboxylic acids, metal alcoholates, metal phenolates, and metal hydroxides, tertiary amines, tertiary phosphines, onium salt compounds of phosphorus, quaternary ammonium salts, and the like as catalysts of particularly promoting the isocyanurate-forming reaction. Of these, alkali metal salts such as potassium acetate and potassium 2-ethylhexanoate, quaternary ammonium salt-based catalysts such as quaternary hydroxyalkyltrimethylammonium 2-ethylhexanoate salt, S-triazine compounds such as 1,3,5-tris(N,N-dimethylaminopropyl)hexahydro-S-triazine, and specific tertiary amines such as 2,4,6-tris(dimethylaminomethyl)phenol are widely used because of high isocyanurate-forming activity. Furthermore, as the quaternary ammonium salts, tetraalkylammonium salts such as tetraalkylammonium organic acid salts are known (see, for example, Patent Document 1 for tetraalkylammonium organic acid salts).

However, in the case of using these catalysts for producing rigid polyurethane foams and isocyanurate-modified rigid polyurethane foams, there is a problem that a polyester polyol in a raw material-blended composition is tend to be hydrolyzed in the present of water or a blowing agent containing water and an amine-based catalyst, and thus the storage stability of the raw material-blended composition decreases to result in impossible preparation of normally blown products. For solving the problem, an improvement of the polyol component and influences of flame retardant and catalyst have been investigated but a sufficient solution has not yet been proposed (see, for example, Non-Patent Document 1 for storage stability of raw material-blended compositions).

Patent Document 1: Japanese Patent No. 3012897
Non-Patent Document 1: MCADAMS et al., "Stabilization of rigid Systems Containing Aromatic Polyester Polyol and Water", Polyurethane Conference 2002, Conference Proceedings, Page 3 to 8.

DISCLOSURE OF THE INVENTION

As mentioned above, a raw material-blended composition for producing rigid polyurethane foams and isocyanurate-modified rigid polyurethane foams is frequently stored for from several weeks to three months after its blending. However, with regard to the raw material-blended compositions containing water, which is an inexpensive and environmentally less problematic blowing agent, or a specific hydrocarbon (HC) and/or hydrofluorocarbon (HFC)-based blowing agent, there arise problems such as a decreased storage stability as well as deteriorated surface brittleness (friability), insufficient adhesiveness to face materials, decreased dimensional stability of foams, and deteriorated flame retardancy, in the rigid polyurethane foam and isocyanurate-modified rigid polyurethane foam products produced therefrom.

The present invention has been made in view of the above problems, and objects thereof are to provide a catalyst composition capable of enhancing storage stability of a raw material-blended composition containing water or a blowing agent composed of water and specific HC and/or HFC, and a polyester polyol by inhibiting the hydrolysis of the polyester polyol in the raw material-blended composition, a raw material-blended composition containing the catalyst composition, and a process for producing a rigid polyurethane foam and/or an isocyanurate-modified rigid polyurethane foam using the raw material-blended composition.

As a result of extensive studies for solving the above problems, the present inventors have found that, in the raw material-blended composition containing water or a blowing agent composed of water and specific HC and/or HFC, particularly, the hydrolysis of a polyester polyol is remarkably improved and thus the storage stability of the raw material-blended composition is enhanced by using a catalyst composition containing an amine compound having specific structure and properties, as well as foam physical properties of the resulting rigid polyurethane foam and/or isocyanurate-modified rigid polyurethane foam are excellent. Thus, they have accomplished the present invention.

Namely, the present invention relates to a catalyst composition for producing a rigid polyurethane foam and/or an isocyanurate-modified rigid polyurethane foam, a raw material-blended composition using the same, and a process for producing a rigid polyurethane foam and/or an isocyanurate-modified rigid polyurethane foam using the same, as mentioned below.

[1] A catalyst composition for producing a rigid polyurethane foam and/or an isocyanurate-modified rigid polyurethane foam comprising at least the following amine compounds of (A) and (B):

(A) a quaternary ammonium salt represented by the following general formula (1):

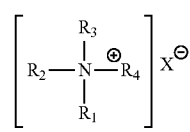

(1)

wherein each of $R_1$ to $R_3$ represents a saturated or unsaturated hydrocarbon group having 1 to 12 carbon atoms, $R_4$ represents an alkyl group or an aromatic hydrocarbon group having 1 to 18 carbon atoms, and X represents an organic acid group having an acid dissociation constant (pKa) of 4.8 or less, provided that any two of $R_1$ to $R_3$ may together form a hetero ring through a carbon atom, an oxygen atom, or a nitrogen atom;

(B) one or two or more hydrophobic amine compounds selected from the group consisting of N-methyldicyclohexylamine, N,N-dimethylbenzylamine, N,N-dimethyloctylamine, N,N-dimethylnonylamine, N,N-dimethyldecylamine, N,N-dimethylundecylamine, N,N-dimethyldodecylamine, N,N-dimethyltridecylamine, N,N-dimethyltetradecylamine, N,N-dimethylpentadecylamine, N,N-dimethylhexadecylamine, N,N-dimethylheptadecylamine, N,N-dimethyloctadecylamine, N-methyldioctylamine, N-methyldinonylamine, N-methyldidecylamine, N-methyldiundecylamine, N-methyldidodecylamine, N-methylditridecylamine, N-methylditetradecylamine, N-methyldipentadecylamine, N-methyldihexadecylamine, N-methyldiheptadecylamine, and N-methyldioctadecylamine.

[2] The catalyst composition according to the above [1], wherein the organic acid constituting the quaternary ammonium salt represented by the general formula (1) is formic acid and/or acetic acid.

[3] The catalyst composition according to the above [1], wherein the quaternary ammonium salt represented by the general formula (1) is one or two or more salts selected from the group consisting of tetramethylammonium acetate, tetramethylammonium formate, tetraethylammonium acetate, tetraethylammonium formate, tetrapropylammonium acetate, tetrapropylammonium formate, tetrabutylammonium acetate, tetrabutylammonium formate, methyltriethylammonium acetate, methyltriethylammonium formate, methyltripropylammonium acetate, methyltripropylammonium formate, methyltributylammonium acetate, methyltributylammonium formate, trimethyldodecylammonium formate, and trimethyldodecylammonium acetate quaternary ammonium salts.

[4] The catalyst composition according to any one of the above [1] to [3], which further contains the following amine compound of (C):

(C) one or two or more heterocyclic tertiary amine compounds selected from the group consisting of 1-isobutyl-2-methylimidazole, 1-methylimidazole, 1,2-dimethylimidazole, 1-(2-hydroxyethyl)-2-methylimidazole, 1-(2-hydroxypropyl)-2-methylimidazole, 1-(2-hydroxyethyl) imidazole, N-methyl-N'-(2-hydroxyethyl)piperazine, and N-(2-hydroxyethyl)morpholine.

[5] A catalyst composition for producing a rigid polyurethane foam and/or an isocyanurate-modified rigid polyurethane foam comprising at least the following amine compounds of (A) and (C):

(A) a quaternary ammonium salt represented by the following general formula (1):

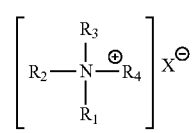

(1)

wherein each of $R_1$ to $R_3$ represents a saturated or unsaturated hydrocarbon group having 1 to 12 carbon atoms, $R_4$ represents an alkyl group or an aromatic hydrocarbon group having 1 to 18 carbon atoms, and X represents an organic acid group having an acid dissociation constant (pKa) of 4.8 or less, provided that any two of $R_1$ to $R_3$ may together form a hetero ring through a carbon atom, an oxygen atom, or a nitrogen atom;

(C) one or two or more heterocyclic tertiary amine compounds selected from the group consisting of 1-isobutyl-2-methylimidazole, 1-methylimidazole, 1,2-dimethylimidazole, 1-(2-hydroxyethyl)-2-methylimidazole, 1-(2-hydroxypropyl)-2-methylimidazole, 1-(2-hydroxyethyl)imidazole, N-methyl-N'-(2-hydroxyethyl)piperazine, and N-(2-hydroxyethyl)morpholine.

[6] The catalyst composition according to the above [5], wherein the organic acid constituting the quaternary ammonium salt represented by the general formula (1) is formic acid and/or acetic acid.

[7] The catalyst composition according to the above [5] or [6], wherein the quaternary ammonium salt represented by the general formula (1) is one or two or more salts selected from the group consisting of tetramethylammonium acetate, tetramethylammonium formate, tetraethylammonium acetate, tetraethylammonium formate, tetrapropylammonium acetate, tetrapropylammonium formate, tetrabutylammonium acetate, tetrabutylammonium formate, methyltriethylammonium acetate, methyltriethylammonium formate, methyltripropylammonium acetate, methyltripropylammonium formate, methyltributylammonium acetate, methyltributylammonium formate, trimethyldodecylammonium formate, and trimethyldodecylammonium acetate quaternary ammonium salts.

[8] A raw material-blended composition for producing a rigid polyurethane foam and/or an isocyanurate-modified rigid polyurethane foam comprising a polyol component, water, and the catalyst composition according to any one of the above [1] to [7].

[9] The raw material-blended composition according to the above [8], which further contains one or two or more compounds selected from the group consisting of 1,1,1,3,3-pentafluorobutane, 1,1,1,3,3-pentafluoropropane, 1,1,1,2-tetrafluoroethane, 1,1,1,2,3,3,3-heptafluoropropane, 1,1,1,2,3,3-hexafluoropropane, 1,1,1,4,4,4-hexafluorobutane, propane, butane, pentane, cyclopentane, and hexane.

[10] The raw material-blended composition according to the above [8] or [9], which contains an aromatic polyester polyol as the polyol component.

[11] A process for producing a rigid polyurethane foam and/or an isocyanurate-modified rigid polyurethane foam, which comprises mixing a polyisocyanate with the raw material-blended composition according to any one of the above [8] to [10] and reacting them.

BEST MODE FOR CARRYING OUT THE INVENTION

In the catalyst composition of the present invention, it is essential that the organic acid constituting the quaternary ammonium salt represented by the above general formula (1) is an organic acid having an acid dissociation constant (pKa) of 4.8 or less. The organic acid having an acid dissociation constant (pKa) of 4.8 or less is not particularly limited, but examples thereof include organic acids such as aliphatic saturated monocarboxylic acids, aliphatic unsaturated monocarboxylic acids, aliphatic polycarboxylic acids, acids having an acidic OH group, and aromatic carboxylic acids. Specifically, there are exemplified isovaleric acid, formic acid, glycolic acid, acetic acid, chloroacetic acid, cyanoacetic acid, dichloroacetic acid, trichloroacetic acid, trimethylacetic acid, fluoroacetic acid, bromoacetic acid, methoxyacetic acid, mercaptoacetic acid, iodoacetic acid, lactic acid, pyruvic acid, 2-chloropropionic acid, 3-chloropropionic acid, levulinic acid, acrylic acid, crotonic acid, vinylacetic acid, methacrylic acid, adipic acid, azelaic acid, oxaloacetic acid, citric acid, glutaric acid, succinic acid, oxalic acid, d-tartaric acid, tartaric acid (meso), suberic acid, sebacic acid, fumaric acid, maleic acid, malonic acid, ascorbic acid, reductic acid, reductone, o-anisic acid, m-anisic acid, p-anisic acid, benzoic acid, cinnamic acid, naphthoic acid, phenylacetic acid, phenoxyacetic acid, phthalic acid, isophthalic acid, terephthalic acid, mandelic acid, and the like. Of these, particularly preferred are formic acid and/or acetic acid.

In the case that an organic acid having an acid dissociation constant (pKa) exceeding 4.8 is used as the organic acid constituting the quaternary ammonium salt represented by the above (A), the polyol component (polyester polyol) contained in the raw material-blended composition is tend to be hydrolyzed and it is likely that the storage stability of the raw material-blended composition decreases to result in impossible preparation of normally foamed products.

In the present invention, examples of the quaternary ammonium salt represented by the above general formula (1) specifically include tetramethylammonium acetate, tetramethylammonium formate, tetraethylammonium acetate, tetraethylammonium formate, tetrapropylammonium acetate, tetrapropylammonium formate, tetrabutylammonium acetate, tetrabutylammonium formate, methyltriethylammonium acetate, methyltriethylammonium formate, methyltripropylammonium acetate, methyltripropylammonium formate, methyltributylammonium acetate, methyltributylammonium formate, trimethyldodecylammonium formate, and trimethyldodecylammonium acetate, and one or two or more thereof can be used.

In the present invention, the above hydrophobic amine compound of (B) is an amine compound whose solubility in 100 g of water is 0.1 g or less. Specific examples thereof include N-methyldicyclohexylamine, N,N-dimethylbenzylamine, N,N-dimethyloctylamine, N,N-dimethylnonylamine, N,N-dimethyldecylamine, N,N-dimethylundecylamine, N,N-dimethyldodecylamine, N,N-dimethyltridecylamine, N,N-dimethyltetradecylamine, N,N-dimethylpentadecylamine, N,N-dimethylhexadecylamine, N,N-dimethylheptadecylamine, N,N-dimethyloctadecylamine, N-methyldioctylamine, N-methyldinonylamine, N-methyldidecylamine, N-methyldiundecylamine, N-methyldidodecylamine, N-methylditridecylamine, N-methylditetradecylamine, N-methyldipentadecylamine, N-methyldihexadecyl amine, N-methyldiheptadecylamine, and N-methyldioctadecylamine, and one or more thereof can be used.

In the present invention, of the above compounds, preferred are N-methyldicyclohexylamine, N,N-dimethylbenzylamine, N,N-dimethyloctylamine, N,N-dimethylnonylamine, N,N-dimethyldecylamine, N,N-dimethylundecylamine, and N,N-dimethyldodecylamine, and particularly preferred are N-methyldicyclohexylamine, N,N-dimethylbenzylamine, N,N-dimethyloctylamine, N,N-dimethyldecylamine, and N,N-dimethyldodecylamine.

In the present invention, in the case that an amine compound whose solubility in 100 g of water exceeds 0.1 g is used, the polyol component in the raw material-blended composition is tend to be hydrolyzed and it is likely that the storage stability of the raw material-blended composition decreases to result in impossible preparation of normally foamed products.

The catalyst composition of the present invention may contain the heterocyclic tertiary amine compound represented by the above (C) in addition to the above amine compounds of (A) and/or (B). In the catalyst composition containing them, since the hydrolysis of the polyol component becomes difficult to occur in the system where the component is present together with the above amine compounds of (A) and (B), a raw material-blended composition excellent in storage stability is obtained.

As the heterocyclic tertiary amine compound represented by the above (C), there are specifically mentioned 1-isobutyl-2-methylimidazole, 1-methylimidazole, 1,2-dimethylimidazole, 1-(2-hydroxyethyl)-2-methylimidazole, 1-(2-hydroxypropyl)-2-methylimidazole, 1-(2-hydroxyethyl)imidazole, N-methyl-N'-(2-hydroxyethyl)piperazine, N-methyl-N'-(2-hydroxypropyl)piperazine, N-methyl-N'-(2-methoxyethyl)piperazine, N-(2-hydroxyethyl)morpholine, N-(2-hydroxypropyl)morpholine, N-methylmorpholine, and N-ethylmorpholine, and one or two or more thereof can be used.

In the present invention, of the above compounds, preferred are 1-isobutyl-2-methylimidazole, 1-methylimidazole, 1,2-dimethylimidazole, 1-(2-hydroxyethyl)-2-methylimidazole, 1-(2-hydroxypropyl)-2-methylimidazole, 1-(2-hydroxyethyl)-imidazole, N-methyl-N'-(2-hydroxyethyl)piperazine, and N-(2-hydroxyethyl)morpholine. Since these heterocyclic tertiary amine compounds inhibit the hydrolysis of the polyester polyol contained in the raw material-blended liquid, the storage stability of the raw material blend can be further enhanced.

In the catalyst composition of the present invention, in the case that the above amine compounds of (A) and (B) are used in combination, in addition to the improvement of the storage stability of the raw material-blended composition, there is obtained a flowability-improving effect of the rigid polyurethane foam and isocyanurate-modified rigid polyurethane foam which have been subjected to the blowing reaction.

Moreover, in the catalyst composition of the present invention, the above amine compounds of (A) and (C) can be also used in combination. In the case that the above amine compounds of (A) and (C) are used in combination, in addition to the improvement of the storage stability of the raw material-blended composition, there is obtained an adhesiveness-improving effect between the rigid polyurethane foam and isocyanurate-modified rigid polyurethane foam which have been subjected to the blowing reaction and a face material.

Furthermore, in the catalyst composition where the amine compounds of (A), (B), and (C) are used in combination, in addition to the improvement of the storage stability of the raw material-blended composition, there is obtained an adhesiveness and flowability-improving effect of the rigid polyurethane foam and isocyanurate-modified rigid polyurethane foam which have been subjected to the blowing reaction.

The mixing ratio of the above individual amine compounds in the catalyst composition of the present invention is not particularly limited but is usually in the range of (A)/(B)/(C)=5 to 90/5 to 90/10 to 90 (weight ratio).

In the catalyst composition of the present invention, other catalyst may be used in combination within the range that does not depart from the advantages of the present invention. As the other catalyst, conventional tertiary amines and the like can be mentioned, for example.

The conventional tertiary amines are not particularly limited, but examples thereof include N,N,N',N'-tetramethylethylenediamine, N,N,N',N'-tetramethyl-propylenediamine, N,N,N',N'',N''-pentamethyldiethylenetriamine, N,N,N',N'',N''-pentamethyl-(3-aminopropyl)ethylenediamine, N,N,N',N'',N''-pentamethyl-dipropylenetriamine, N,N,N',N'-tetramethylguanidine, 1,3,5-tris(N,N-dimethylamino-propyl)hexahydro-S-triazine, 1,8-diazabicyclo[5.4.0]undecene-7, N,N'-dimethyl-piperadine, bis(2-dimethylaminoethyl)ether, 1-dimethylaminopropyl-imidazole, and the like. Moreover, 1,3,5-tris(N,N-dimethylaminopropyl)hexahydro-S-triazine, 2,4,6-tris(dimethylaminomethyl)phenol, and the like can be also used, which have high catalytic activity and nurate activity, and thus can reduce a total amount of the catalysts to be used.

In the catalyst composition of the present invention, a conventional catalyst for polyisocyanurate formation may be used as the other catalyst within the range that does not depart from the advantages of the present invention. The conventional catalyst for polyisocyanurate formation is not particularly limited but, other than the above tertiary amines, there can be used quaternary ammonium salts, organometallic catalysts, tertiary phosphines, onium salt compounds of phosphorus, and the like.

The quaternary ammonium salts are not particularly limited, but examples thereof include tetraalkylammonium halides such as tetramethylammonium chloride, tetraalkylammonium hydroxides such as tetramethylammonium hydroxide, trialkylhydroxypropylammonium organic acid salts such as 2-hydroxypropyl-trimethylammonium formate and 2-hydroxypropyltrimethylammonium 2-ethylhexanoate, and the like. Moreover, there are also mentioned trimethyl-2-hydroxypropyl-based quaternary ammonium 2-ethylhexanoates (see, for example, JP-A-52-17484), which have high catalytic activity and nurate activity and thus can reduce a total amount of the catalysts to be used, and hydroxyalkyl-based quaternary ammonium organic acid salts such as trimethyl-2-hydroxypropyl-based quaternary ammonium formate, trimethyl-2-hydroxypropyl-based quaternary ammonium acetate, quaternary ammonium salts obtained by the reaction of N,N,N,N'',N''-pentamethyldiethylenetriamine/propylene oxide/2-ethylhexanoic acid=1/1/1 by mol (see, for example, JP-A-10-017638), tetraalkylammonium organic acid salts such as tetramethylammonium 2-ethylhexanoate and methyltriethylammonium 2-ethylhexanoate, tetraalkylammonium carbonates such as quaternary ammonium carbonates obtained by the reaction of N,N,N',N'-tetramethylhexamethylenediamine/dimethyl carbonate=1/1.5 by mol (see, for example, JP-A-11-199644), and the like.

Moreover, the organometallic catalyst is not particularly limited, but examples thereof include alkali metal salts of carboxylic acids, such as potassium acetate and potassium 2-ethylhexanoate, stannous diacetate, stannous dioctoate, stannous dioleate, stannous dilaurate, dibutyltin oxide, dibutyltin diacetate, dibutyltin dilaurate, dibutyltin dichloride, dioctyltin dilaurate, lead octanoate, lead naphthenate, nickel naphthenate, and cobalt naphthenate, or lithium, sodium, and potassium salts of carboxylic acids, such as potassium acetate and alkali metal salts of carboxylic acids, such as potassium 2-ethylhexanoate.

In the present invention, in addition thereto, there can be also used trialkylhydroxypropylammonium organic acid salts such as 2-hydroxypropyltrimethylammonium 2-ethylhexanoate, tetraalkylammonium organic acid salts such as methyltriethylammonium 2-ethylhexanoate, and hydroxyalkyl-based quaternary ammonium organic acid salts such as quaternary ammonium salts obtained by the reaction of N,N,N',N'',N''-pentamethyldiethylenetriamine/propylene oxide/2-ethylhexanoic acid=1/1/1 by mol (e.g., cf. JP-A-10-017638), tetraalkylammonium carbonates such as quaternary ammonium carbonates obtained by the reaction of N,N,N',N'-tetramethylhexamethylenediamine/dimethyl carbonate=1/1.5 by mol (see, for example, JP-A-11-199644), 1,3,5-tris(N,N-dimethyl-aminopropyl)hexahydro-S-triazine, and 2,4,6-tris(dimethylaminomethyl)phenol.

The raw material-blended composition of the present invention comprises a polyol component and water in addition to the above catalyst composition.

The amount of the catalyst composition to be used in the raw material-blended composition of the present invention is not particularly limited, but is preferably in the range of 0.5 to 15 parts by weight per 100 parts by weight of the polyol component. If the amount is 0.5 part by weight or less, the reaction rate is tend to decrease and the productivity is tend to be poor. If the amount is 15 parts by weight or more, the polyester polyol is tend to be hydrolyzed. In this connection, in the case that the other catalyst is used in combination with the amine compounds of the (A) to (C), the amount of the other catalyst is preferably in the range of 0.5 to 5 parts by weight and in the range of 1 to 20 parts by weight in total including the amine compounds of the (A) to (C), per 100 parts by weight of the polyol component.

The polyol component to be used in the raw material-blended composition of the present invention is preferably an aromatic polyester polyol or preferably contains an aromatic polyester polyol. By using an aromatic polyester polyol as a polyol component, a highly flame-retardant rigid polyurethane foam and isocyanurate-modified rigid polyurethane foam can be obtained.

The aromatic polyester polyol is not particularly limited, but examples thereof include those obtained by the reaction of a dibasic acid and a hydroxyl compound (e.g., a glycol, etc.), those described in Keiji Iwata "Polyurethane Resin Handbook" (1st ed., 1987) Nikkan Kogyo Shimbunsha, Ltd., p. 116-117 such as DMT residue, polyester polyols starting with phthalic anhydride, wastes at Nylon production, TMP, wastes of pentaerythritol, wastes of phthalic acid-based polyesters, polyester polyols derived from treatments of such waste products and the like.

In the present invention, in addition to the above, there can be exemplified those obtained by the esterification of phthalic acid, isophthalic acid, terephthalic acid, phthalic anhydride, and wastes thereof, aromatic dicarboxylic acids and derivative thereof from waste articles.

In the present invention, a preferable hydroxyl value of the aromatic polyester polyol is in the range of 150 to 450.

Examples of the dibasic acid to be used as a raw material of the polyester polyol include adipic acid, phthalic acids, succinic acid, azelaic acid, sebacic acid, recinoleic acid, and the like. Since a satisfactory flame retardancy can be obtained, phthalic acids containing an aromatic ring are preferred.

Moreover, examples of the hydroxyl compound which forms the aromatic polyester polyol include ethylene glycol, diethylene glycol, propylene glycol, dipropylene glycol, butylene glycol, hexanediol, neopentyl glycol, trimethylolpropane, hexanetriol, glycerin, pentaerythritol, phenol, derivatives thereof, and the like.

With regard to the ratio of the aromatic polyester polyol in the polyol component in the raw material-blended composition of the present invention, a sufficient flame retardancy is not obtained when the amount is too small, so that the polyester polyol is preferably contained in the polyol component in an amount of 30% by weight or more.

As other polyols than the polyester polyol to be used in the present invention, for example phenol type polyols such as conventional mannich base polyols, etc., polyester polyols, flame retardant polyols such as phosphorus-containing polyols and halogen-containing polyols, etc., and polymer polyols may be mentioned.

As the phenol type polyols such as mannich base polyols, for example, polyether polyols obtained by mannich modification of phenol and/or derivative(s) thereof (hereinafter referred to as "mannich-modified polyols"), namely polyether polyols obtained by ring-opening addition polymerization of an alkylene oxide such as ethylene oxide or propylene oxide and the products obtained by mannich modification of phenol or a phenol derivative such as nonylphenol or an alkylphenol using formaldehyde and a secondary amine such as diethanolamine, ammonia, or a primary amine may be used. Since such a mannich-modified polyol has a high self-reactivity and also a relatively high flame retardancy, the reaction can be promptly proceeded at spray blowing in spray-blowing type rigid polyurethane foam without remarkably impairing its flame-retardant properties. However, if the ratio of the mannish-modified polyol in the polyol component exceeds 70% by weight, it is likely that the flame retardant properties become worse. Therefore, in the case of using the mannich-modified polyol, the ratio in the polyol component is usually 70% by weight or less, preferably in the range of 20 to 50% by weight.

Moreover, as the polyester polyol, for example, polyester polyol compounds obtained by ring-opening addition polymerization of an alkylene oxide such as ethylene oxide or propylene oxide to an initiator different from the mannich-modified polyol, such as ethylenediamine, tolylenediamine, sucrose, an aminoalcohol, or diethylene glycol may be used. However, if the ratio of the polyester polyol in the polyol component exceeds 70% by weight, it is likely that the flame retardant properties become worse, so that the ratio in the polyol component is usually 70% by weight or less, preferably in the range of 20 to 50% by weight.

Furthermore, as the flame-retardant polyols such as phosphorus-containing polyols and halogen-containing polyols, for example, phosphorus-containing polyols obtained by addition of an alkylene oxide to a phosphorus compound, halogen-containing polyols obtained by ring-opening polymerization of epichlorohydrin or trichlorobutylene oxide, halogen-containing polyols such as brominated pentaerythritol/sucrose type polyols and tetrabromophthalic polyesters, phenol polyols such as mannich-base polyols, and the like may be mentioned. However, if the ratio of the flame retardant polyol in the polyol component exceeds 70% by weight, the flame retardant properties are improved but smoke emitting properties become worse, so that the ratio in the polyol component is usually 70% by weight or less, preferably in the range of 20 to 50% by weight.

The raw material-blended composition of the present invention comprises at least water as a component for blowing.

In the present invention, it is preferable that the blowing is caused by carbon dioxide generated from the reaction between water and a polyisocyanate compound when water is added to the raw material-blended composition.

The blowing agent in the present invention may be only carbon dioxide formed by the addition of water, but specific HC and/or HFC can be used in combination therewith.

Examples of HFC include 1,1,1,3,3-pentafluorobutane, 1,1,1,3,3-pentafluoropropane, 1,1,1,2-tetrafluoroethane, 1,1,1,2,3,3,3-heptafluoropropane, 1,1,1,2,3,3-hexafluoropropane, 1,1,1,4,4,4-hexafluorobutane, and the like. It is preferable to use one or two or more compounds selected from the group consisting of these compounds. Of these, 1,1,1,3,3-pentafluorobutane, 1,1,1,3,3-pentafluoropropane, 1,1,1,2,3,3,3-heptafluoropropane, and 1,1,1,2-tetrafluoroethane are particularly preferred.

As HC, it is usually preferred to use a hydrocarbon having a boiling point of −30 to 70° C. As specific examples thereof, it is preferable to use one or two or more compounds selected from the group consisting of propane, butane, pentane, cyclopentane, hexane, and mixtures thereof.

In the present invention, in the case that specific HC and/or HFC are used in combination, the amount of water to be used as a blowing agent is usually in the range of 0.5 to 20 parts by weight, preferably in the range of 1 to 20 parts by weight, per 100 parts by weight of the polyol component. If the amount of water to be used is smaller than the range, blowing is insufficient and thus lowering of the density of the foam cannot sufficiently be achieved and also it is likely that it becomes difficult to obtain an effect of reducing the amount of HC and/or HFC to be used. On the other hand, if the amount of water to be used exceeds the above range, remarkable blowing may occur and hence handling becomes difficult as well as it is likely that a problem of hydrolysis of the polyester polyol may arise. Therefore, in the case that specific HC and/or HFC are used in combination, usually, water is used in an amount of 0.5 to 20 parts by weight and HC and/or HFC are used in an amount of 2 to 40 parts by weight, preferably water is used in an amount of 1 to 20 parts by weight and HC and/or HFC are used in an amount of 2 to 40 parts by weight, per 100 parts by weight of the polyol component.

In the present invention, in the case that HC and/or HFC are not used in combination with water, water is preferably used in an amount of 3 to 20 parts by weight per 100 parts by weight of the polyol component.

The raw material-blended composition of the present invention may contain the other additives within the commonly employed ranges so long as the advantages of the present invention can be obtained. As such additives, for example, a foam stabilizer, a flame retardant, a cross-linking agent, a chain-extender, or the like are mentioned.

In the present invention, a surfactant may be used as a foam stabilizer, if necessary. As the surfactant to be used, organic silicone-based surfactants are mentioned, for example. Specifically, there are exemplified nonionic surfactants such as organosiloxane-polyoxyalkylene copolymers, silicone-grease copolymers or mixtures thereof. The amount thereof to be used is preferably in the range of 0.1 to 10 parts by weight per 100 parts by weight of the polyol.

Moreover, the raw material-blended composition of the present invention may contain a flame retardant, if necessary. The flame retardant to be used is not particularly limited, but examples thereof include reactive flame retardants such as phosphorus-containing polyols, e.g., propoxylated phosphoric acid obtained by addition reaction between phosphoric acid and an alkylene oxide, or propoxylated dibutylpyrophosphate; tertiary phosphate esters such as tricresyl phosphate; halogen-containing tertiary phosphate esters such as tris(2-chloroethyl) phosphate or tris(chloropropyl) phosphate; halogen-containing organic compounds such as dibromopropanol, dibromoneopentyl glycol or tetrabromobisphenol A; inorganic compounds such as antimony oxide, magnesium carbonate, calcium carbonate or aluminum phosphate; and the like. Since the content thereof varies depending on flame retardancy required, it is not particularly limited, but the content is preferably in the range of 4 to 20 parts by weight per 100 parts by weight of the polyol.

In the present invention, a cross-linking agent or a chain extender may be used, if necessary. Examples of the cross-linking agent or chain extender include polyhydric alcohols such as ethylene glycol, 1,4-butanediol or glycerin, low molecular weight amine polyols such as diethanolamine or triethanolamine, polyamines such as ethylenediamine, xylylenediamine or methylene-bis-orthochloroaniline, and the like.

In the present invention, a coloring agent, an antiaging agent, and the other known additives may also be used, as the case requires. The types and amounts of such additives may usually be within the commonly emplyed ranges.

In the process of the present invention, a rigid polyurethane foam and/or an isocyanurate-modified rigid polyurethane foam are produced by mixing a polyisocyanate with the above raw material-blended composition and subsequently reacting them.

In the process of the present invention, the polyisocyanate is not particularly limited, but as the polyisocyanate, for example, one or two or more compounds of aromatic polyisocyante compounds such as diphenylmethane diisocyanate or tolylene diisocyanate, alicyclic polyisocyanates such as isophorone diisocyanate, aliphatic polyisocyanates such as hexamethylene diisocyanate, and the like can be used. In this connection, the isocyanate index of the polyisocyanate in the present invention is usually 70 or more, and the index is preferably in the range of 70 to 120 in the case of producing rigid polyurethane foam products and preferably in the range of 120 to 500 in the case of producing isocyanurate-modified rigid polyurethane foam products.

In the case that a rigid polyurethane foam and/or an isocyanurate-modified rigid polyurethane foam are produced using the raw material-blended composition of the present invention, the foam can be produced by rapidly mixing and stirring the above raw material-blended composition and the polyisocyanate and subsequently pouring the resulting mixture into an appropriate vessel or mold to carry out molded blowing. The mixing and stirring may be performed by means of a general stirrer or an exclusive polyurethane foaming machine. As the polyurethane foaming machine, high-pressure, low-pressure, and spraying type instruments can be employed.

The rigid polyurethane foam and/or isocyanurate-modified rigid polyurethane foam of the present invention thus obtained preferably have a core density of 10 to 100 kg/m$^3$. If the core density exceeds 100 kg/m$^3$, a combustible component increases and the flame retardancy deteriorates and further the cost increases. If the core density is less than 10 kg/m$^3$, strength properties become poor.

The products produced by the process of the present invention can be used in various applications. As applications of the products, for examples, heat-insulating materials and structuring materials in building fields and civil engineering fields, heat-insulating materials of freezer, refrigerators, freezing showcases, and the like in electric appliance field, heat-insulating materials of LPG or LNG tankers and pipelines in plant fields and ship field, and heat-insulating materials of cold boxes and freezer trucks in automobile fields may be mentioned.

EXAMPLES

The present invention is described more specifically with reference to the following examples and comparative examples, but the present invention is not limited to these examples only.

In the following examples and comparative examples, the measuring method of each measuring item is as follows.
Measuring Item for Reactivity:
  Gel time: the time required for changing a liquid material into a resinous material through the progress of reaction was measured.

Core Density of Foam:

A central part of a foam subjected to a free-rised foaming in a 2 L polyethylene cup was cut into a size of 70 mm×70 mm×200 mm, and the size and weight thereof were accurately measured to calculate core density.

Flowability of Foam:

A mixed raw material in a given amount was poured into a mold made of aluminum having a size of 110×30×5 cm and foamed, and then the length (cm) of the resulting foam was measured. The longer the foam is, the more excellent in flowability the foam is.

Dimensional Stability of Foam:

A central part of a foam subjected to a free-rised foaming in a 2 L polyethylene cup was cut into a size of 70 mm×70 mm×200 mm and then a degree of change in the thickness direction was measured under conditions of 20° C.×1 month.

Adhesive Strength of Foam:

A free-rised foaming was carried out in a 2 L polyethylene cup. A plate made of SUS304 having a size of 5 cm×5 cm was set on the upper surface of a foam. After 1 hour of foaming, 90° peeling strength of the set plate made of SUS304 was measured. The peeling strength was defined as the adhesive strength of the foam.

Preparation Example 1

Production of Catalyst A1 (solution of 50% of tetraethylammonium acetate and 50% of ethylene glycol)

An aqueous tetraethylammonium hydroxide solution (1 mol) was charged into a flask and, while the solution was cooled so as to maintain it at room temperature, acetic acid (1 mol) was added thereto to obtain a tetraethylammonium acetate salt. Thereafter, ethylene glycol was added as a solvent so as to be a predetermined concentration and then water was removed by evaporation using an evaporator to obtain a solution of 50% of tetraethylammonium acetate and 50% of ethylene glycol.

Preparation Example 2

Production of Catalyst A2 (solution of 50% of tetramethylammonium acetate and 50% of ethylene glycol)

A solution of 50% of tetramethylammonium acetate and 50% of ethylene glycol was obtained in the same manner as in Preparation Example 1 except that an aqueous tetramethylammonium hydroxide solution (1 mol) was used instead of the aqueous tetraethylammonium hydroxide solution.

Preparation Example 3

Production of Catalyst A3 (solution of 50% of tetramethylammonium formate and 50% of ethylene glycol)

A solution of 50% of aqueous tetramethylammonium formate and 50% of ethylene glycol was obtained in the same manner as in Preparation Example 2 except that formic acid (1 mol) was used instead of acetic acid.

Preparation Example 4

Production of Catalyst H (solution of 50% of methyltriethylammonium 2-ethylhexanoate and 50% of ethylene glycol)

Triethylamine (1 mol), diethyl carbonate (1.5 mol), and methanol (2 mol) as a solvent were charged into a stirring-type autoclave, and the whole was reacted at the reaction temperature of 110° C. for 12 hours to obtain a methanol solution of methyltriethylammonium carbonate. 2-Ethylhexanoic acid (1 mol) was charged thereto and ethylene glycol was added as a solvent so as to be a predetermined concentration. Thereafter, a solution of 50% of methyltriethylammonium 2-ethylhexanoate and 50% of ethylene glycol was obtained by removing carbon dioxide and methanol produced as by-products by an evaporator.

Preparation Example 5

Production of Catalyst C1 [1-(2-hydroxypropyl)-2-methylimidazole]

2-Methylimidazole (1 mol) and methanol as a solvent were charged into a stirring-type autoclave, and propylene oxide (1 mol) was reacted therewith at a reaction temperature of 80° C. to 140° C. Thereafter, by purification through distillation, 1-(2-hydroxypropyl)-2-methylimidazole was obtained.

Examples 1 to 10 and Comparative Examples 1 to 9

A raw material-blended liquid was prepared with a formulation shown in Table 1 or 2. The weight ratio of the raw material-blended liquid and a polyisocyanate was determined so as to result in a predetermined isocyanate index and they were subjected to blowing reaction by stirring at the liquid temperature of 20° C. at 6000 to 9000 rpm for 3 seconds using a laboratory mixer to produce an isocyanurate-modified rigid polyurethane foam.

GT (gel time) at that time was visually measured. The gel time was defined as initial reactivity. Moreover, on the resulting isocyanurate-modified rigid polyurethane foam, the core density, dimensional stability, and adhesive strength were measured. Then, the scale of the raw materials was increased and molded foaming was carried out in the same manner by placing the raw materials in a mold whose temperature was regulated to 40° C. After 10 minutes from the time when the mixed liquid was placed therein, the resulting foam was removed from the mold. The flowability of the foam was evaluated based on the molded foam.

Then, the above raw material-blended composition containing the amine compound was placed in an airtight container and the whole was allowed to stand at 50° C. for 7 days. Thereafter, GT at the time when the composition was mixed with an isocyanate at the liquid temperature of 20° C. to carry out foaming in the same manner was measured. The GT was defined as reactivity after storage. These results are shown in Tables 1 and 2.

TABLE 1

|  |  |  |  |  | Example | | | | | | | | | |
|---|---|---|---|---|---|---|---|---|---|---|---|---|---|---|
|  |  |  |  |  | 1 | 2 | 3 | 4 | 5 | 6 | 7 | 8 | 9 | 10 |
| Blend formulation (part by wt.) | Raw material-blended liquid |  |  | Polyol[1] | 100 | 100 | 100 | 100 | 100 | 100 | 100 | 100 | 100 | 100 |
|  |  |  |  | Flame retardant[2] | 15 | 15 | 15 | 15 | 15 | 15 | 15 | 15 | 15 | 15 |
|  |  |  |  | Foam stabilizer[3] | 1.5 | 1.5 | 1.5 | 1.5 | 1.5 | 1.5 | 1.5 | 1.5 | 1.5 | 1.5 |
|  |  | Catalyst Composition | Amine compound | Catalyst A1[4] | 3.2 | 3.2 | 3.2 | 3.2 | — | — | — | — | 3.2 | — |
|  |  |  |  | Catalyst A2[5] | — | — | — | — | 3.1 | 4.8 | 3.1 | — | — | 3.5 |

TABLE 1-continued

|  |  |  | Example |  |  |  |  |  |  |  |  |  |
|---|---|---|---|---|---|---|---|---|---|---|---|---|
|  |  |  | 1 | 2 | 3 | 4 | 5 | 6 | 7 | 8 | 9 | 10 |
|  | (A) Amine compound | Catalyst A3[6] | — | — | — | — | — | — | — | 4.0 | — | — |
|  | (B) Amine compound | Catalyst B1[7] | 1.7 | — | — | — | — | — | — | 1.7 | 0.8 | — |
|  |  | Catalyst B2[8] | — | — | — | — | — | — | 1.6 | — | — | 1.6 |
|  | (C) Amine compound | Catalyst C1[9] | — | 1.8 | 1.8 | 1.8 | 1.8 | — | — | — | 0.9 | — |
|  |  | Catalyst C2[10] | — | — | — | — | — | 1.5 | — | — | — | 1.0 |
|  |  | Catalyst D[11] | — | — | — | — | — | — | — | — | — | — |
|  |  | Catalyst E[12] | — | — | — | — | — | — | — | — | — | — |
|  |  | Catalyst F[13] | — | — | — | — | — | — | — | — | — | — |
|  |  | Catalyst G[14] | — | — | — | — | — | — | — | — | — | — |
|  |  | Catalyst H[15] | — | — | — | — | — | — | — | — | — | — |
|  |  | Blowing agent A[16] | 3.0 | 3.0 | — | — | 3.0 | — | 3.0 | 3.0 | 3.0 | — |
|  |  | Blowing agent B[17] | — | — | 4.0 | — | — | — | — | — | — | — |
|  |  | Blowing agent C[18] | — | — | — | 5.0 | — | — | — | — | — | — |
|  |  | Water | 3.0 | 3.0 | 3.0 | 3.0 | 3.0 | 6.0 | .0. | 3.0 | 3.0 | 6.0 |
| Polyisocyanate[19] |  |  | 208 | 208 | 208 | 208 | 208 | 299 | 208 | 208 | 208 | 299 |
| Isocyanate Index |  |  | 200 | 200 | 200 | 200 | 200 | 200 | 200 | 200 | 200 | 200 |
| Initial Reactivity GT (second) |  |  | 30 | 31 | 30 | 30 | 29 | 32 | 30 | 32 | 29 | 33 |
| Reactivity after storage GT (second) |  |  | 31 | 31 | 30 | 30 | 29 | 32 | 31 | 33 | 30 | 35 |
| GT change ratio (%) |  |  | 3.3 | 0.0 | 0.0 | 0.0 | 0.0 | 0.0 | 3.3 | 3.0 | 3.4 | 6.0 |
| Core density (kg/m³) |  |  | 28.1 | 27.9 | 27.8 | 28.4 | 28.0 | 28.6 | 28.1 | 27.4 | 27.6 | 28.9 |
| Flowability (cm) |  |  | 82.6 | 74.1 | 73.6 | 73.9 | 74.5 | 77.2 | 81.6 | 83.3 | 80.4 | 78.5 |
| Dimensional stability (%) |  |  | −0.5 | −0.3 | −0.6 | −0.2 | −0.4 | −0.9 | −0.4 | −0.6 | −0.4 | −0.4 |
| Adhesive strength (kg/cm²) |  |  | 1.5 | 2.1 | 2.2 | 2.4 | 2.5 | 2.0 | 1.6 | 1.6 | 2.2 | 1.8 |

[1] Waste PET-based polyester polyol (OH value = 241 mg KOH/g) manufactured by Oxid L.P.
[2] Trischloropropyl phosphate (trade name: Fyrol PCF) manufactured by Akzo Nobel K.K.
[3] Silicone-based surfactant (trade name: SZ-1627) manufactured by Nippon Unicar Co., Ltd.
[4] Solution of 50% of tetraethylammonium acetate and 50% of ethylene glycol (synthesized product)
[5] Solution of 50% of tetramethylammonium acetate and 50% of ethylene glycol (synthesized product)
[6] Solution of 50% of tetramethylammonium formate and 50% of ethylene glycol (synthesized product)
[7] N,N-Dimethyldodecylamine (manufactured by Tokyo Kasei Kogyo Co., Ltd.)
[8] N-Methyldicyclohexylamine (manufactured by Tokyo Kasei Kogyo Co., Ltd.)
[9] 1-(2-Hydroxypropyl)-2-methylimidazole (synthesized product)
[10] 70% of 1,2-dimethylimidazole, 30% of ethylene glycol (trade name: TOYOCAT-DM70) manufactured by Tosoh Corporation
[11] 1-Isobutyl-2-methylimidazole manufactured by Nippon Nyukazai Co., Ltd.
[12] 75% of N,N,N-trimethyl-N-hydroxypropylammonium 2-ethylhexanoate, 25% of diethylene glycol (trade name: DABCO-TMR) manufactured by Air Products and Chemicals
[13] 75% of potassium 2-ethylhexanoate, 25% of diethylene glycol (trade name: DABCO-K15) manufactured by Air Products and Chemicals
[14] N,N,N',N'-Tetramethylhexamethylenediamine (trade name: TOYOCAT-MR) manufactured by Tosoh Corporation
[15] Methyltriethylammonium 2-ethylhexanoate (synthesized product)
[16] HFC-245fa (1,1,1,3,3-pentafluoropropane) manufactured by Central Glass Co., Ltd.
[17] HFC-365mfc (1,1,1,3,3-pentafluorobutane) manufactured by Solvay
[18] Zeonsolve HP (cyclopentane) manufactured by Nippon Zeon Corporation
[19] Polymeric MDI (trade name: MR-200, NCO content = 31.0%) manufactured by Nippon Polyurethane Industry Co., Ltd.

TABLE 2

|  |  |  |  |  |  | Comparative Example |  |  |  |  |  |  |  |  |  |
|---|---|---|---|---|---|---|---|---|---|---|---|---|---|---|---|
|  |  |  |  |  |  | 1 | 2 | 3 | 4 | 5 | 6 | 7 | 8 | 9 | 10 |
| Blend formulation (part by wt.) | Raw material-blended liquid |  |  |  | Polyol[1] | 100 | 100 | 100 | 100 | 100 | 100 | 100 | 100 | 100 | 100 |
|  |  |  |  |  | Flame retardant[2] | 15 | 15 | 15 | 15 | 15 | 15 | 15 | 15 | 15 | 15 |
|  |  |  |  |  | Foam stabilizer[3] | 1.5 | 1.5 | 1.5 | 1.5 | 1.5 | 1.5 | 1.5 | 1.5 | 1.5 | 1.5 |
|  |  | Catalyst composition | Amine compound (A) | Catalyst A1[4] | — | — | — | — | — | — | — | 5.8 | 3.2 | — |
|  |  |  |  | Catalyst A2[5] | — | — | — | — | — | — | — | — | — | — |
|  |  |  |  | Catalyst A3[6] | — | — | — | — | — | — | — | — | — | — |
|  |  |  | Amine compound (B) | Catalyst B1[7] | — | — | — | — | — | — | — | — | — | 1.7 |
|  |  |  |  | Catalyst B2[8] | — | — | — | — | — | — | — | — | — | — |
|  |  |  | Amine compound (C) | Catalyst C1[9] | — | — | — | — | — | — | — | — | — | — |
|  |  |  |  | Catalyst C2[10] | — | — | — | — | — | — | — | — | — | — |
|  |  |  |  | Catalyst D[11] | — | — | — | — | 2.2 | — | — | — | — | — |
|  |  |  |  | Catalyst E[12] | — | — | 4.2 | — | — | 4.2 | — | — | — | 4.2 |
|  |  |  |  | Catalyst F[13] | — | — | — | 3.0 | 3.0 | — | 3.0 | — | — | — |
|  |  |  |  | Catalyst G[14] | — | — | — | — | — | 1.1 | 1.1 | — | 1.1 | — |
|  |  |  |  | Catalyst H[15] | 2.8 | 5.0 | — | — | — | — | — | — | — | — |
|  |  |  |  | Blowing agent A[16] | 3.0 | — | 3.0 | 3.0 | 3.0 | 3.0 | 3.0 | — | 3.0 | 3.0 |
|  |  |  |  | Blowing agent B[17] | — | — | — | — | — | — | — | — | — | — |
|  |  |  |  | Blowing agent C[18] | — | — | — | — | — | — | — | — | — | — |

TABLE 2-continued

|  | | Comparative Example | | | | | | | | | |
|---|---|---|---|---|---|---|---|---|---|---|---|
|  | | 1 | 2 | 3 | 4 | 5 | 6 | 7 | 8 | 9 | 10 |
| Water | | 3.0 | 6.0 | 3.0 | 3.0 | 3.0 | 3.0 | 3.0 | 6.0 | 3.0 | 3.0 |
| Polyisocyanate[19] | | 208 | 299 | 208 | 208 | 208 | 208 | 208 | 299 | 208 | 208 |
| Isocyanate Indx | | 200 | 200 | 200 | 200 | 200 | 200 | 200 | 200 | 200 | 200 |
| Initial Reactivity GT (second) | | 30 | 28 | 30 | 30 | 28 | 28 | 28 | 28 | 28 | 28 |
| Reactivity after storage GT (second) | | 41 | 64 | 42 | 42 | 41 | 56 | 57 | 31 | 36 | 36 |
| GT change ratio (%) | | 36.7 | 128.6 | 40.0 | 40.0 | 46.4 | 100.0 | 103.6 | 10.7 | 28.6 | 28.6 |
| Core density (kg/m$^3$) | | 32.4 | 32.4 | 32.9 | 28.4 | 27.8 | 32.4 | 28.4 | 28.3 | 27.9 | 32.4 |
| Flowability (cm) | | 69.9 | 67.8 | 69.9 | 78.8 | 74.7 | 64.7 | 74.1 | 80.9 | 74.5 | 64.8 |
| Dimensional stability (%) | | −0.5 | −4.2 | −1.2 | −4.3 | −1.2 | −1.3 | −1.5 | −0.9 | −0.9 | −0.9 |
| Adhesive strength (kg/cm$^2$) | | 1.1 | 0.3 | 0.8 | 0.6 | 1.5 | 0.6 | 0.6 | 1.6 | 0.6 | 0.9 |

[1] Waste PET-based polyester polyol (OH value = 241 mg KOH/g) manufactured by Oxid L.P.
[2] Trischloropropyl phosphate (trade name: Fyrol PCF) manufactured by Akzo Nobel K.K.
[3] Silicone-based surfactant (trade name: SZ-1627) manufactured by Nippon Unicar Co., Ltd.
[4] Solution of 50% of tetraethylammonium acetate and 50% of ethylene glycol (synthesized product)
[5] Solution of 50% of tetramethylammonium acetate and 50% of ethylene glycol (synthesized product)
[6] Solution of 50% of tetramethylammonium formate and 50% of ethylene glycol (synthesized product)
[7] N,N-Dimethyldodecylamine (manufactured by Tokyo Kasei Kogyo Co., Ltd.)
[8] N-Methyldicyclohexylamine (manufactured by Tokyo Kasei Kogyo Co., Ltd.)
[9] 1-(2-Hydroxypropyl)-2-methylimidazole (synthesized product)
[10] 70% of 1,2-dimethylimidazole, 30% of ethylene glycol (trade name: TOYOCAT-DM70) manufactured by Tosoh Corporation
[11] 1-Isobutyl-2-methylimidazole manufactured by Nippon Nyukazai Co., Ltd.
[12] 75% of N,N,N-trimethyl-N-hydroxypropylammonium 2-ethylhexanoate, 25% of diethylene glycol (trade name: DABCO-TMR) manufactured by Air Products and Chemicals
[13] 75% of potassium 2-ethylhexanoate, 25% of diethylene glycol (trade name: DABCO-K15) manufactured by Air Products and Chemicals
[14] N,N,N',N'-Tetramethylhexamethylenediamine (trade name: TOYOCAT-MR) manufactured by Tosoh Corporation
[15] Methyltriethylammonium 2-ethylhexanoate (synthesized product)
[16] HFC-245fa (1,1,1,3,3-pentafluoropropane) manufactured by Central Glass Co., Ltd.
[17] HFC-365mfc (1,1,1,3,3-pentafluorobutane) manufactured by Solvay
[18] Zeonsolve HP (cyclopentane) manufactured by Zeon Corporation
[19] Polymeric MDI (trade name: MR-200, NCO content = 31.0%) manufactured by Nippon Polyurethane Industry Co., Ltd.

As is apparent from Table 1, examples 1 to 10 are the examples, wherein the amine compounds (A) and (B) and/or (C) are used in combination as the catalysts. And each of them showed small decrease of reactivity after storage and also a GT change ratio of 10% or less. Moreover, the resulting foams have core density, flowability, dimensional stability, and adhesive strength, all of which fall within preferable ranges.

To the contrary, as is apparent from Table 2, comparative examples 1 to 10 are the examples, wherein the amine compounds (A) and (B) and/or (C) are not used in combination as the catalyst. And each of them showed large decrease of reactivity after storage.

For example, comparative examples 1 to 4 are the examples, wherein no quaternary ammonium salt compound using an organic acid showing pKa of the present invention is used as the catalyst composition. And each of them showed slower GT after storage and poor storage stability. In particular, in comparative example 2, the GT change ratio after storage exceeded 100% and the time required for reactive curing was twice that before storage, so that the case was not suitable in practical use.

Moreover, in comparative examples 6 and 7 using no above amine compounds of (A) to (C), the GT change ratio after storage exceeded 100% and the time required for reactive curing was twice that before storage, so that the case was not suitable in practical use.

Furthermore, in comparative example 8 using the above amine compound of (A), the decrease of reactivity and decrease of adhesiveness after storage were observed.

While the present invention has been described in detail and with reference to specific examples thereof, it will be apparent to one skilled in the art that various changes and modifications can be made therein without departing from the spirit and scope thereof.

The present application is based on Japanese Patent Application No. 2003-338661 filed on Sep. 29, 2003, and the contents are incorporated herein by reference.

Industrial Applicability

In a raw material-blended composition for producing a rigid polyurethane foam and/or an isocyanurate-modified rigid polyurethane foam comprising a polyol component and water, the catalyst composition of the present invention can enhance storage stability of the raw material-blended composition with inhibiting the hydrolysis of the polyol.

Moreover, according to the present invention, since the amount of HC and/or HFC to be used as a blowing agent other than water can be reduced, a process for producing a rigid polyurethane foam and/or an isocyanurate-modified rigid polyurethane foam can be provided, which can enhance environmental safety and economical efficiency and wherein the raw material-blended composition is excellent in storage stability, flame retardancy, and practical use.

Furthermore, the rigid polyurethane foam and isocyanurate-modified rigid polyurethane foam produced using the catalyst composition and raw material-blended composition of the present invention are excellent in flowability of foam and adhesive strength.

The invention claimed is:

1. A raw material-blended composition for producing a rigid polyurethane foam and/or an isocyanurate-modified rigid polyurethane foam comprising an aromatic polyester polyol component, water, a blowing agent, and a catalyst composition comprising at least the following amine compounds (A) and (B):

(A) a quaternary ammonium salt represented by the following general formula (1):

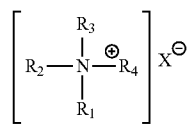

wherein each of $R_1$ to $R_3$ represents a saturated or unsaturated hydrocarbon group having 1 to 12 carbon atoms, $R_4$ represents an alkyl group or an aromatic hydrocarbon group having 1 to 18 carbon atoms, and X represents an organic acid group selected from the group consisting of acetic acid and formic acid, provided that any two of $R_1$ to $R_3$ may together form a hetero ring through a carbon atom, an oxygen atom, or a nitrogen atom;

(B) one or more hydrophobic amine compounds selected from the group consisting of N-methyldicyclohexylamine, N,N-dimethyloctylamine, N,N-dimethylnonylamine, N,N-dimethyldecylamine, N,N-dimethylundecylamine, N,N-dimethyldodecylamine, N,N-dimethyltridecylamine, N,N-dimethyltetradecylamine, N,N-dimethylpentadecylamine, N,N-dimethylhexadecylamine, N,N-dimethylheptadecylamine, N,N-dimethyloctadecylamine, N-methyldioctylamine, N-methyldinonylamine, N-methyldidecylamine, N-methyldiundecylamine, N-methyldidodecylamine, N-methylditridecylamine, N-methylditetradecylamine, N-methyldipentadecylamine, N-methyldihexadecylamine, N-methyldiheptadecylamine, and N-methyldioctadecylamine, and wherein the blowing agent is at least one selected from the group consisting of 1,1,1,3,3-pentafluorobutane, 1,1,1,3,3-pentafluoropropane, 1,1,1,2-tetrafluoroethane, 1,1,1,2,3,3,3-heptafluoropropane, 1,1,1,2,3,3-hexafluoropropane, 1,1,1,4,4,4-hexafluorobutane, propane, butane, pentane, cyclopentane, and hexane.

2. The composition according to claim 1, wherein the quaternary ammonium salt represented by the general formula (1) is one or more salts selected from the group consisting of tetramethylammonium acetate, tetramethylammonium formate, tetraethylammonium acetate, tetraethylammonium formate, tetrapropylammonium acetate, tetrapropylammonium formate, tetrabutylammonium acetate, tetrabutylammonium formate, methyltriethylammonium acetate, methyltriethylammonium formate, methyltripropylammonium acetate, methyltripropylammonium formate, methyltributylammonium acetate, methyltributylammonium formate, trimethyldodecylammonium formate, and trimethyldodecylammonium acetate quaternary ammonium salts.

3. The composition according to claim 1, which further comprises at least one heterocyclic tertiary amine compound selected from the group consisting of 1-isobutyl-2-methylimidazole, 1-methylimidazole, 1,2-dimethylimidazole, 1-(2-hydroxyethyl)-2-methylimidazole, 1-(2-hydroxypropyl)-2-methylimidazole, 1-(2-hydroxyethyl) imidazole, N-methyl-N'-(2-hydroxyethyl)piperazine, and N-(2-hydroxyethyl)morpholine.

4. A process for producing a rigid polyurethane foam and/or an isocyanurate-modified rigid polyurethane foam, which comprises
mixing a polyisocyanate with the raw material-blended composition according to claim 1, and
reacting the raw material-blended composition and the polyisocyanate.

5. A raw material-blended composition for producing a rigid polyurethane foam and/or an isocyanurate-modified rigid polyurethane foam comprising an aromatic polyester polyol component, water, a blowing agent, and a catalyst composition for producing a rigid polyurethane foam and/or an isocyanurate-modified rigid polyurethane foam comprising at least the following amine compounds (A) and (C):

(A) a quaternary ammonium salt represented by the following general formula (1):

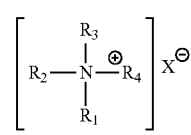

wherein each of $R_1$ to $R_3$ represents a saturated or unsaturated hydrocarbon group having 1 to 12 carbon atoms, $R_4$ represents an alkyl group or an aromatic hydrocarbon group having 1 to 18 carbon atoms, and X represents an organic acid group selected from the group consisting of acetic acid and formic acid, provided that any two of $R_1$ to $R_3$ may together form a hetero ring through a carbon atom, an oxygen atom, or a nitrogen atom;

(C) one or more heterocyclic tertiary amine compounds compound selected from the group consisting of 1-isobutyl-2-methylimidazole, 1-methylimidazole, 1,2-dimethylimidazole, 1-(2-hydroxyethyl)-2-methylimidazole, 1-(2-hydroxypropyl)-2-methylimidazole, 1-(2-hydroxyethyl) imidazole, N-methyl-N'-(2-hydroxyethyl)piperazine, and N-(2-hydroxyethyl) morpholine, and wherein the blowing agent is at least one selected from the group consisting of 1,1,1,3,3-pentafluorobutane, 1,1,1,3,3-pentafluoropropane, 1,1,1,2-tetrafluoroethane, 1,1,1,2,3,3,3-heptafluoropropane, 1,1,1,2,3,3-hexafluoropropane, 1,1,1,4,4,4-hexafluorobutane, propane, butane, pentane, cyclopentane, and hexane.

6. The composition according to claim 5, wherein the quaternary ammonium salt represented by the general formula (1) is one or more salts selected from the group consisting of tetramethylammonium acetate, tetramethylammonium formate, tetraethylammonium acetate, tetraethylammonium formate, tetrapropylammonium acetate, tetrapropylammonium formate, tetrabutylammonium acetate, tetrabutylammonium formate, methyltriethylammonium acetate, methyltriethylammonium formate, methyltripropylammonium acetate, methyltripropylammonium formate, methyltributylammonium acetate, methyltributylammonium formate, trimethyldodecylammonium formate, and trimethyldodecylammonium acetate quaternary ammonium salts.

7. A process for producing a rigid polyurethane foam and/or an isocyanurate-modified rigid polyurethane foam, which comprises
mixing a polyisocyanate with the raw material-blended composition according to claim 5, and
reacting the raw material-blended composition and the polyisocyanate.

8. The raw material-blended composition according to claim 1, wherein the quaternary ammonium salt (A) is at least one selected from the group consisting of tetraethylammonium acetate, tetramethylammonium acetate and tetramethylammonium formate, and the hydrophobic amine compound (B) is N, N-dimethyldodecylamine.

9. The raw material-blended composition according to claim 1, wherein (A) is at least one quaternary ammonium salts selected from the group consisting of tetramethylammonium acetate, tetraethylammonium acetate, tetrapropylammonium acetate, tetrapropylammonium formate, methyltriethylammonium acetate and methyltripropylammonium acetate; and wherein (B) is at least one hydrophobic amine compound selected from the group consisting of N,N-dimethyloctylamine, N,N-dimethylnonylamine, N,N-dimethyldecylamine, N,N-dimethylundecylamine, N,N-dimethyldodecylamine, N,N-dimethyltridecylamine, N,N-dimethyltetradecylamine, N,N-dimethylpentadecylamine, N,N-dimethylhexadecylamine, N,N-dimethylheptadecylamine, and N,N-dimethyloctadecylamine.

10. The raw material-blended composition according to claim 1, wherein (B) is at least one hydrophobic amine compound selected from the group consisting of N,N-dimethylundecylamine, N,N-dimethyldodecylamine and N,N-dimethyltridecylamine.

11. The composition according to claim 1, wherein the quaternary ammonium salt is at least one selected from the group consisting of tetraethylammonium acetate, tetramethylammonium acetate and tetramethylammonium formate, and the hydrophobic amine compound is at least one selected from the group consisting of N,N-dimethyldodecylamine and N-methyldicyclohexylamine.

12. The composition according to claim 5, further comprising at least one hydrophobic amine compound (B) selected from the group consisting of N,N-dimethyldodecylamine and N-methyldicyclohexylamine;

wherein the quaternary ammonium salt (A) is at least one selected from the group consisting of tetraethylammonium acetate, tetramethylammonium acetate and tetramethylammonium formate, and the heterocyclic tertiary amine compound is at least one selected from the group consisting of 1-(2-hydroxypropyl)-2-methylimidazole and 1,2-dimethylimidazole.

13. The composition according to claim 1, wherein the quaternary ammonium salt is at least one selected from the group consisting of tetraethylammonium acetate, tetramethylammonium acetate and tetramethylammonium formate; and the hydrophobic amine compound is at least one selected from the group consisting of N,N-dimethyldodecylamine, N-methyldicyclohexylamine, and N,N-dimethylhexadecylamine.

14. The composition according to claim 5, further comprising at least one hydrophobic amine compound (B) selected from the group consisting of N,N-dimethyldodecylamine and N-methyldicyclohexylamine;

wherein the quaternary ammonium salt (A) is at least one selected from the group consisting of tetraethylammonium acetate, tetramethylammonium acetate and tetramethylammonium formate; and the heterocyclic tertiary amine compound (C) is at least one selected from the group consisting of 1-(2-hydroxypropyl)-2-methylimidazole, 1,2-dimethylimidazole, and 1-methylimidazole.

* * * * *